United States Patent [19]

Lee et al.

[11] Patent Number: 5,095,080

[45] Date of Patent: Mar. 10, 1992

[54] OLEFIN POLYMERIZATION CATALYST AND METHOD FOR PRODUCTION AND USE

[75] Inventors: Clifford C. Lee, Houston, Tex.; M. Bruce Welch, Bartlesville, Okla.

[73] Assignee: Phillips Petroleum Company, Bartlesville, Okla.

[21] Appl. No.: 709,454

[22] Filed: Jun. 3, 1991

Related U.S. Application Data

[62] Division of Ser. No. 569,805, Aug. 20, 1990.

[51] Int. Cl.$^5$ .................................................. C08F 4/64
[52] U.S. Cl. ...................................... 526/119; 526/125; 526/352
[58] Field of Search ........................... 526/119, 125

[56] References Cited

U.S. PATENT DOCUMENTS

| | | | |
|---|---|---|---|
| 3,789,036 | 1/1974 | Longi et al. | 260/80.7 |
| 3,993,588 | 11/1976 | Thukral | 252/429 C |
| 4,307,209 | 12/1981 | Morita et al. | 525/246 |
| 4,315,836 | 2/1982 | Albizzati et al. | 252/429 B |
| 4,326,988 | 4/1982 | Welch et al. | 252/429 B |
| 4,330,649 | 5/1982 | Kioka et al. | 526/125 |
| 4,371,679 | 2/1983 | Kuroda et al. | 526/116 |
| 4,456,695 | 6/1984 | Nimura et al. | 502/104 |
| 4,508,844 | 4/1985 | Agapiou | 502/105 |
| 4,542,198 | 9/1985 | Mayr et al. | 526/125 |

*Primary Examiner*—Patrick P. Garvin
*Assistant Examiner*—Brent M. Peebles
*Attorney, Agent, or Firm*—Edward L. Bowman

[57] ABSTRACT

A new highly active olefin polymerization catalyst as disclosed. The catalyst is prepared by contacting a magnesium dihalide with a halogenated titanium alkoxide to obtain a first solid, washing this first solid unit it is substantially free of soluble halogenated titanium alkoxide, then contacting the first solid with a titanium tetrachloride to yield a second solid.

15 Claims, No Drawings

OLEFIN POLYMERIZATION CATALYST AND METHOD FOR PRODUCTION AND USE

This application is a division of application Ser. No. 07/569,805, filed Aug. 20, 1990, now allowed.

FIELD OF THE INVENTION

The present invention relates to the polymerization of olefins. In another aspect, this invention relates to novel catalyst and the method for the production of such catalyst.

BACKGROUND OF THE INVENTION

It has been many years since it was first discovered that one could polymerize olefins using a catalyst comprising a transition metal compound and a co-catalyst comprising an organometallic reducing agent. Early on it was discovered that some benefits could be obtained by combining the transition metal compound with other particulate materials. One of the most often used particulate material has been magnesium chloride, particularly when the magnesium chloride is in an activated form. There are numerous patents disclosing how one can obtain an activated magnesium dichloride. Some examples are U.S. Pat. Nos. 4,315,836 and 4,542,198, the disclosures of which are incorporated herein by reference.

While the use of an activated magnesium chloride has generally been found to increase the activity of the catalyst, there are a number of other characteristics that need to be taken into account in order to obtain the most desirable catalysts. Some examples of these other characteristics include the settling rate of the catalyst, the final chlorine content of the catalyst, the density of the polymer produced with the catalyst, the bulk density of the polymer produced with the catalyst, and the molecular weight distribution of the polymer produced with the catalyst.

An object of the present invention is to provide an improved type of magnesium dihalide containing olefin polymerization catalyst. Other aspects, advantages, and benefits of the present invention will be apparent to one skilled in the art having the benefit of this disclosure.

SUMMARY OF THE INVENTION

In accordance with the present invention there is provided a process for preparing an olefin polymerization catalyst by contacting a magnesium dihalide with a halogenated titanium alkoxide to obtain a first solid, washing the first solid until the first solid is substantially free of soluble halogenated titanium alkoxide, then contacting the first solid with a titanium tetrachloride to yield a second solid. Preferably this second solid is also washed until it is substantially free of soluble halogenated titanium tetrachloride.

The inventive catalyst is used in the polymerization of olefins in generally the same manner as other supported transition metal olefin polymerization catalysts have been used in the past.

DETAILED DESCRIPTION OF THE INVENTION

The term "magnesium dihalide" as employed herein refers to magnesium chloride or magnesium bromide. Preferably the magnesium dihalide is substantially anhydrous, i.e. contains less than about 2 weight percent of water. In the most preferred embodiments the magnesium dihalide is an activated type of magnesium dihalide. The term "activated" magnesium dihalide as used herein refers to a magnesium dihalide which has an X-ray spectrum which differs from that of normal (non-activated) magnesium dihalide. The term "normal" (non-activated) magnesium dihalide as used herein refers to the crystalline magnesium dihalides the spectra of which are shown in ASTM sheets 3-0854 and 15-836 for magnesium dichloride and magnesium dibromide, respectfully. The activated magnesium dihalides exhibit a broadened line rather than a sharp line in the area of the maximum intensity of the spectrum of a normal, non-activated magnesium dihalide. Generally, in the case of magnesium dichloride the broadened line is in the range of from about 2.44 angstroms to about 2.97 angstroms. For activated magnesium dibromide the broadened line is present in the range between about 2.8 angstroms and about 3.2 angstroms.

Activated magnesium dihalides can also be obtained, for example by reacting an organomagnesium compound of the type RMgX, or alcoholates of the formula ROMgX in which R is an alkyl or aryl radical having 1 to 18 carbons, X is a halogen and X' is a halogen or a OR radical, with a halogenating substance such as silica tetrachloride, tin tetrachloride, bromide trichloride, or aluminum halide such as aluminum trichloride, dialkylaluminum chloride, and alkylaluminum dichloride.

It is also possible to obtain active magnesium dihalides by evaporating solutions of the organomagnesium compounds and ethers at a temperature of up to about 200° C. or by treating such solutions with anhydrous hydrogen halides in such amounts and conditions to cause the magnesium dihalide to precipitate.

To prepare the inventive catalyst, magnesium dihalide is contacted with a halogenated titanium alkoxide. The currently preferred halogenated titanium alkoxides are compounds of the formula $(RO)_3TiCl$ wherein each R is individually selected from alkyl groups containing 1 to 10 carbon atoms, more preferably 1 to 5 carbon atoms. It is currently preferred to carry out the contacting between the magnesium dihalide and the halogenated titanium alkoxide by mixing the two together in a normally liquid suitable diluent. Examples of suitable diluents include liquids of the type often used for the preparation of transition metal catalysts or for the polymerization of olefins with such catalysts. Some specific examples include hydrocarbon liquids such as n-heptane, pentane, hexane, octane, decane, dodecane, tetradecane, kerosene, cyclopentane, methylcyclopentane, cyclohexane, methylcyclohexane, cyclooctane, cyclohexene, benzene, toluene, xylene, ethylbenzene, and the like.

The contacting between the halogenated titanium alkoxide and the magnesium dihalide can be carried out under any suitable reaction conditions. Temperatures in the range of 20° C. to 200° C. would be an example. It is however, generally preferred to carry out the contacting at a temperature somewhat above normal ambient temperature. Preferred techniques involve heating the mixture at a temperature of at least about 100° C. for a time sufficient to obtain generally optimum interaction between the magnesium dichloride and the halogenated titanium alkoxide. Examples of contact times include times in the range of 5 minutes to 5 hours.

The amount of halogenated titanium alkoxide can vary over a wide range. An excess can readily be employed and the unneeded amount removed in a subsequent treatment which will be described. The optimum amount of halogenated titanium alkoxide needed for a given amount of magnesium dihalide can be readily determined using routine experimentation. One example of a range for the molar ratio of the halogenated titanium alkoxide to magnesium dichloride is about 0.01/1 to about 100/1.

After the magnesium dihalide and the halogenated titanium alkoxide have been contacted, the resulting solid is then subjected to a washing operation. The object of the washing operation is to obtain a solid which is substantially free of soluble halogenated titanium alkoxide. Typically the washing liquid would be the same liquid that was used in the contacting step or some other suitable liquid in which the halogenated titanium alkoxide is soluble. Typically the washing is conducted at normal ambient temperature, for example a temperature in the range of about 18° C. to about 27° C.

After the washed solid is recovered it is contacted with the titanium tetrachloride. The contacting can be carried out in the presence of a suitable normally liquid diluent, however, it can be carried out by merely contacting the solid with liquid titanium tetrachloride. As with the halogenated titanium alkoxide, the titanium tetrachloride can be employed in excess. The optimum amount of titanium tetrachloride to be employed can be readily determined by routine experimentation. One example of a range for the molar ratio of titanium tetrachloride to the $MgCl_2$ would be about 0.01/1 to about 100/1. The contacting between the titanium tetrachloride and the washed solid can be carried out under any suitable temperature conditions. As a general rule, however, the contacting would normally be carried out at least about 18° C. In more preferred embodiments the contacting is carried out at a temperature of at least about 100° C.

After the treatment with the titanium tetrachloride the resulting solid is again washed with a suitable solvent for the titanium tetrachloride. Here again, the washing would generally be conducted at a temperature in the range of from about 18° C. to about 27° C. It is currently preferred for the washing to be carried out in such a manner as to obtain a final solid which is substantially free of soluble titanium tetrachloride, at temperatures in the range of 18° C. to 27° C.

The solid obtained after this washing process could be used as is, but, would generally be dried and stored for later use. As with all transition metal catalyst it is desirable to ensure that the catalyst be protected from water and oxygen prior to its use. The inventive transition metal catalyst can be used in the polymerization of olefins using conventional methods, such as by operating either in the liquid phase with a liquid diluent, or where the polymerization medium is the monomer itself, or in the gaseous phase. The polymerization temperature can vary over a wide range for example, within the range of about −80° C. to about 200° C. Generally the polymerization would be conducted at a temperature in the range of about 40° to about 110° C. The pressure generally can be atmospheric pressure or higher pressure.

The catalyst is particularly suitable for the production of homopolymers of ethylene. It is however within the scope of the present invention to polymerize other α-olefins including ethylene with mixtures of other α-olefins, such as α-olefins having 3 to 8 carbon atoms. Some examples include propylene, 1-hexene, 1-butene, and 4-methyl-1-pentene.

The molecular weight of the polymer produced can be regulated during the polymerization or copolymerization by using known molecular weight regulating agents, such as, for instance aluminum alkyls or aluminum alkyl halides, organometallic compounds of zinc or cadmium, or hydrogen.

Typically the inventive catalyst would be employed in combination with a co-catalyst such as a hydride or organometallic compound of a metal belonging to Groups I–III of the Periodic Table. Some examples of such co-catalyst include triethylaluminum, triisobutylaluminum, diethylaluminum hydride, diisobutylaluminum hydride, diethylaluminum chloride, ethylaluminum dichloride, and ethylaluminum sesquichloride. The molar ratio between the organometallic compound or hydride and the titanium of the catalyst can vary over a wide range. Generally the molar ratio would be in the range of about 0.01/1 to about 5000/1. Bench scale work would often be done at a molar ratio in the range of about 0.4/1 to about 2100/1. Commercial scale work would often be done at a molar ratio of about 0.3/1 to about 15/1.

The invention will now be further illustrated by a few actual examples.

EXAMPLE I

In this catalyst preparation magnesium dichloride was employed which had been converted into activated magnesium dichloride by ballmilling. About 1 gram of the ball milled magnesium chloride and 40 milliliters of n-heptane were added to a 10 oz. bottle. Then 2.75 milliliters of a 1M molar solution of chlorotitaniumtriisopropoxide in n-heptane was added to the bottle. The mixture was then heated in a 100° C. oil bath for two hours. The resulting solid was washed three times with n-heptane then 2.0 milliliters of neat liquid titanium tetrachloride was added to the solid and the mixture was stirred for one hour at room temperature. The resulting solid was then washed three times with n-heptane and dried and weighed. This catalyst was then used in the polymerization of ethylene using triethylaluminum as a co-catalyst. The reaction conditions included a hydrogen partial pressure of 150 psi and an ethylene partial pressure of 200 psi. The polyethylene polymer obtained had a melt index of 84 and a high load melt index of 2,055. The productivity of the catalyst was 25,900 grams of polymer per gram of catalyst per hour. The polymer contained only 2.6 parts per million of titanium.

The catalyst was also used to carry out a copolymerization between ethylene and hexene-1. In this case the copolymer obtained had a melt index of 3.3 and a density of 0.9433 grams per milliliter. The productivity was 26,900 grams of polymer per gram of catalyst per hour and the polymer contained 2.2 parts per million of titanium. In yet another experiment the same catalyst was employed in the homopolymerization of ethylene but in this case no hydrogen was employed. A productivity of 73,000 grams of polymer per grams of catalyst per hour was observed and the polyethylene had a density of 0.9433 grams per cc. The activity, hydrogen response, and comonomer incorporation of this catalyst are very desirable.

EXAMPLE II

Another inventive catalyst was prepared by placing 1 gram of a ball milled magnesium chloride in a 10 oz. bottle and adding 40 milliliters of n-heptane followed by the addition of 20 milliliters of a 1 molar solution of chlorotitaniumtriisopropoxide in n-hexane. The chlorotitaniumtriisopropoxide solution was obtained from Aldredge Chemicals. The resulting mixture was then heated in a 100° C. oil bath for 30 minutes. Then after cooling to room temperature the resulting solid was washed with n-heptane three times. The white solid was allowed to settle and the supernatant was decanted to one inch above the solid. It was observed that the solid settled extremely fast. Then 1.0 milliliters of neat liquid titanium tetrachloride was added to this mixture and the slurry was stirred at room temperature for 1 hour. The resulting solid was then washed three times with n-heptane to yield 0.9 grams of solid.

The resulting catalyst was then employed in a series of ethylene polymerizations. Two of these involved the homopolymerization of ethylene using triethylaluminum as a co-catalyst. The partial hydrogen pressure was 150 psi and the partial ethylene pressure was 200 psi. In one of the runs a polymer having a melt index of 76.6 and a bulk density of 17.2 was obtained. In the other homopolymerization run a polymer having a melt index of 81.2 and a bulk density of 17.6 was obtained. In this second polymerization the resulting polymer contained 3.1 parts per million of titanium and in the first mentioned polymerization the polymer contained 2.0 parts per million titanium. For both polymerizations a sieve analysis of the polymer product was conducted. The particle size range was within acceptable limits for commercial application.

This catalyst was also employed in the copolymerization of ethylene and 1-hexene, again using triethylaluminum as the co-catalyst. The partial hydrogen pressure was 50 psi and the partial ethylene pressure was 200 psi and 107 grams of hexene-1 monomer was used. The resulting polymer had a melt index of 2.7, a bulk density of 16.4, a density of 0.9464 and the polymer contained 2.8 parts per million of titanium. A sieve analysis indicated that the polymer particles were of a desirable size distribution.

EXAMPLE III

For comparison another catalyst was prepared using a similar process but in which the titanium tetrachloride final treatment was not employed. In this case 1 gram of the ball milled magnesium dichloride and 20 milliliters of the 1 molar chlorotitaniumtriisopropoxide/n-hexane solution were combined in a bottle. The bottle was then heated for 2 hours with stirring. After that the mixture was cooled at room temperature for 20 minutes then washed three times with n-heptane. The supernatant was decanted to 2 inches above the solid. Subsequently 10 milliliters of the 1 molar chlorotitaniumtriisopropoxide/n-hexane solution was added and the mixture stirred at room temperature for 1 hour. The resulting solid was then washed three times with n-heptane. The supernatant was decanted and then the catalyst was dried. When this catalyst was employed in the homopolymerization of ethylene the productivity was only 1,480 grams of polymer per gram of catalyst per hour. This indicates that selection of the particular titanium compounds employed can have a extremely significant effect upon the activity of the catalyst.

EXAMPLE IV

In this example a series of catalysts were prepared to evaluate the effects of the various titanium compounds and the order of their use in the catalyst preparation. In these catalyst preparations an activated magnesium chloride was used which had been prepared by ball milling normal magnesium dichloride for 4 hours. In these catalyst preparations chlorotitaniumtriisopropoxide was prepared by combining titanium tetrachloride and titanium tetraisopropoxide in a molar ratio of 1:3.

A first catalyst referred to hereinafter as Catalyst A was prepared by contacting 2 grams of the ball milled magnesium chloride with 10 cc of titanium tetrachloride and 150 milliliters of n-heptane. The mixture was then refluxed for 1 hour at about 96° C. and the resulting solid was washed three times with n-heptane.

Another catalyst referred to hereinafter as Catalyst B was prepared by contacting 2 grams of the ball milled magnesium dichloride with 10 cc of the solution resulting from the combination of titanium tetrachloride and titanium tetraisopropoxide in a molar ratio of 1:3. Again 150 milliliters of n-heptane was also employed. The resulting mixture was then refluxed for 1 hour at about 96° C. The resulting solid was then washed three times with n-heptane.

A third catalyst hereinafter referred to as Catalyst C was prepared by contacting 2 grams of the ball milled magnesium chloride with 10 cc of titanium tetrachloride and 150 milliliters of n-heptane. The mixture was refluxed for 1 hour at about 96° C. and then the solid was washed three times with n-heptane. The solid resulting after this wash was then contacted with 10 cc of the chlorotitaniumtriisopropoxy compound which resulted from the combination of the titanium tetrachloride and the titanium tetraisopropoxide. This mixture was then again refluxed for 1 hour and the solid washed three times with n-heptane.

Finally, a catalyst referred to hereinafter as Catalyst D was prepared by combining 2 grams of the ball milled magnesium chloride with 10 cc of the synthesized chlorotitaniumtriisopropoxide, and 150 milliliters of n-heptane. The resulting mixture was refluxed for 1 hour at about 96° C. and then washed three times with n-heptane. The resulting solid was then contacted with 10 cc of titanium tetrachloride. In this case the mixture was not subjected to reflux but was merely stirred with the titanium tetrachloride. Subsequently the resulting solid was washed three times with n-heptane and the dry solid recovered.

The resulting four catalysts were then employed in the copolymerization of ethylene and hexene using substantially comparable conditions for each catalyst. Triethylaluminum was used as the cocatalyst. The partial hydrogen pressure was 25 psig and 90 grams of hexene-1 monomer was used.

A summary of the results obtained with the various catalysts is summarized in the following table.

TABLE 1

| Catalyst | Productivity g/g Cat. | g/g Ti (×10⁻³) | MI | HLMI MI | Density g/cc | Bulk Density lb/ft³ | Ti ppm | Cl ppm | Ti in Cat. wt. % |
| --- | --- | --- | --- | --- | --- | --- | --- | --- | --- |
| A | 1804 | 582 | 0.32 | 50 | 0.9357 | 9.5 | 1.7 | 400 | 0.31 |
| B | 293 | 28 | 0.88 | 30 | 0.9382 | 9.0 | 36 | 2200 | 1.05 |
| C | 88 | 24 | 1.03 | 28 | 0.9439 | 10.3 | 41 | 8800 | 0.36 |

TABLE 1-continued

| Catalyst | Productivity g/g Cat. | g/g Ti (×10⁻³) | MI | HLMI MI | Density g/cc | Bulk Density lb/ft³ | Ti ppm | Cl ppm | Ti in Cat. wt. % |
|---|---|---|---|---|---|---|---|---|---|
| D | 3030 | 673 | 0.64 | 48 | 0.9339 | 11.1 | 1.5 | 180 | 0.45 |

Catalyst A - without Ti(iPO)₃Cl
Catalyst B - without TiCl₄
Catalyst C - TiCl₄ then Ti(iPO)₃Cl
Catalyst D - Ti(iPO₃Cl then TiCl₄ (inventive run)

These results demonstrate that the inventive catalyst, i.e. Catalyst D, has a higher productivity than the other catalyst. The inventive catalyst also produces polymer with the lowest chlorine content in the polymer, the highest bulk density, and the lowest density. Also it provided a desirable HLMI/MI ratio. It is noted that in the run using Catalyst C the amount of co-catalyst used was double that used in each of the other runs. An earlier run using Catalyst C and the same amount of co-catalyst that was used in the other runs did not yield any significant production of polymer.

That which is claimed is:

1. A process for polymerizing an α-olefin comprising contacting said α-olefin with a catalytic amount of a catalyst system comprising a co-catalyst and a catalyst prepared by contacting a magnesium dihalide with a halogenated titanium alkoxide to obtain a first solid, washing said first solid until said first solid is substantially free of soluble halogenated titanium alkoxide, then contacting said first solid with titanium tetrachloride to yield a second solid.

2. A process according to claim 1 wherein said halogenated titanium alkoxide is selected from the group consisting of compounds of a formula (RO)₃TiCl wherein each R is individually selected from alkyl groups containing 1 to 5 carbon atoms.

3. A process according to claim 2 wherein said second solid is washed until substantially free of soluble titanium tetrachloride.

4. A process according to claim 3 wherein said magnesium dihalide and said halogenated titanium alkoxide are contacted in the presence of a suitable inert diluent.

5. A process according to claim 4 wherein said magnesium dihalide consists essentially of anhydrous magnesium dihalide in activated form.

6. A process according to claim 5 wherein said magnesium dihalide consists essentially of magnesium dichloride.

7. A process according to claim 6 wherein said magnesium dichloride has been activated by ball milling.

8. A process according to claim 7 wherein said halogenated titanium alkoxide consists essentially of chlorotitaniumtriisopropoxide.

9. A process according to claim 6 wherein said halogenated titanium alkoxide consists essentially of chlorotitaniumtriisopropoxide.

10. A process according to claim 4 wherein said halogenated titanium alkoxide consists essentially of chlorotitaniumtriisopropoxide.

11. A process according to claim 8 wherein said chlorotitaniumtriisopropoxide is prepared by combining titanium tetrachloride and titanium tetra(isopropoxide) in a molar ratio of about 1:3.

12. A process according to claim wherein ethylene and at least one other α-olefin containing 3 to 8 carbon atoms are polymerized together.

13. A process according to claim 12 wherein said co-catalyst consists essentially of triethylaluminum.

14. A process according to claim 9 wherein said co-catalyst consists essentially of an organoaluminum compound selected from the group consisting of triethylaluminum, triisobutylaluminum, diethylaluminum hydride, diisobutylaluminum hydride, diethylaluminum chloride, ethylaluminum dichloride, and ethylaluminum sesquichloride.

15. A process for polymerizing an α-olefin comprising preparing an olefin polymerization catalyst by contacting a magnesium dihalide with a halogenated titanium alkoxide to obtain a first solid, washing said first solid until said first solid is substantially free of soluble titanium alkoxide, then contacting said first solid with titanium tetrachloride to yield a second solid, optionally washing said second solid until substantially free of titanium tetrachloride, and employing the resulting solid in the presence of at least one olefin under suitable polymerization conditions in the further presence of a suitable co-catalyst.

* * * * *

UNITED STATES PATENT AND TRADEMARK OFFICE
CERTIFICATE OF CORRECTION

PATENT NO. : 5,095,080
DATED : March 10, 1992
INVENTOR(S) : Clifford C. Lee and M. Bruce Welch It is certified that error appears in the above-identified patent and that said Letters Patent is hereby corrected as shown below:

Column 8, claim 12, line 1, after "claim", please insert ---1---.

Signed and Sealed this

Fourth Day of May, 1993

Attest:

MICHAEL K. KIRK

Attesting Officer

Acting Commissioner of Patents and Trademarks